Figure 1:
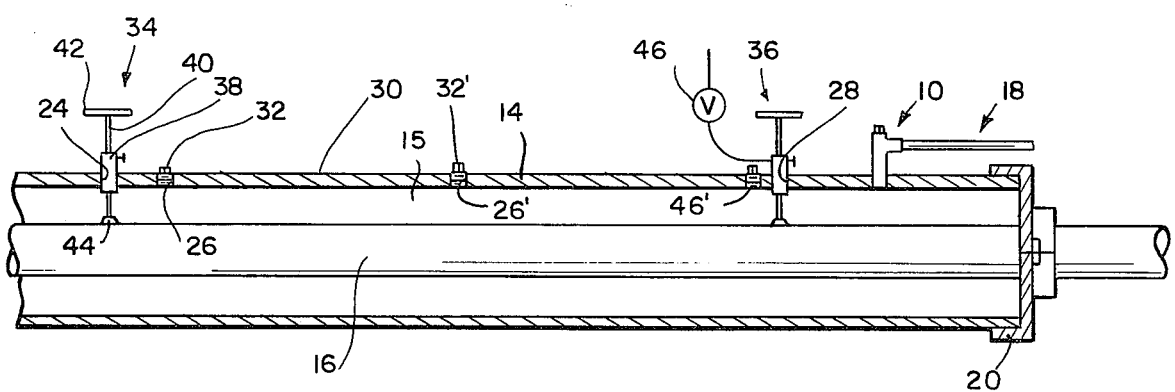

United States Patent [19]

Martin et al.

[11] 4,009,732
[45] Mar. 1, 1977

[54] METHODS OF SEALING ANNULAR SPACE BETWEEN INNER AND OUTER GAS MAINS FOR TIE-OVERS

[76] Inventors: Luther W. Martin, 1221 Julie Drive, Champaign, Ill. 61820; Richard L. Smith, Box 682, St. Joseph, Ill. 61873

[22] Filed: Mar. 1, 1976

[21] Appl. No.: 662,949

[52] U.S. Cl. .................................................. 138/97
[51] Int. Cl.² ........................................ F16L 55/12
[58] Field of Search .................... 138/97, 113, 114

[56] References Cited
UNITED STATES PATENTS

| | | | |
|---|---|---|---|
| 3,294,121 | 12/1966 | Powell et al. | 138/93 X |
| 3,845,789 | 11/1974 | Rohrer | 138/97 |

*Primary Examiner*—Harry N. Haroian
*Attorney, Agent, or Firm*—Jenkins, Hanley & Coffey

[57] ABSTRACT

A method of tying over an individual customer service connection from a live outer gas main to an inner gas main inserted therein. The inner main is centered within the outer main and an annular region is defined upstream from the customer service connection which is to be tied over. An opening is formed in the side wall of the live outer main intermediate the ends of the annular region and a quantity of a high-density froth foam such as, for example, urethane foam, sufficient to fill the annular region is injected into it. The foam is allowed to harden to prevent gas from flowing downstream below the annular region to the service connection to be tied over. The outer main may then be cut away downstream from the annular region and the new customer service connection made through the side wall of the inner main exposed by cutting away the outer main. In the first embodiment of the method, a special centering tool contains a valve. This centering tool is used at the downstream end of the annular region and customer service connections below this downstream end are closed. At the beginning of the foam-injection step, the valve in the special centering tool is opened. As the foam fills the annular region, a static pressure chamber is formed downstream from the special centering tool. Filling of the annular region is indicated when foam flows outwardly through the valve in the centering tool. In a second embodiment of the method, the annular region is defined between a pair of line restrictors at the upstream and downstream ends of the annular region. Gas flow downstream past the line restrictors carries foam to the downstream end of the annular region, insuring that the annular region will be filled with foam.

10 Claims, 6 Drawing Figures

METHODS OF SEALING ANNULAR SPACE BETWEEN INNER AND OUTER GAS MAINS FOR TIE-OVERS

This invention deals with methods of sealing an annular space between an inner gas main and an outer gas main into which the inner main has been inserted for tying over individual customer service lines from the outer main to the inner main. Specifically, the method of this invention is useful with, for example, the method and apparatus described in our co-pending United States Patent Application Ser. No. 662,948, filed Mar. 1, 1976, and titled *Live Gas Main Insertions*, filed herewith.

Many prior art patents outline methods for inserting new smaller diameter, higher pressure, corrosion resistant gas main pipe within existing larger diameter, corroded gas main pipe. See, for example, U.S. Pat. No. 3,845,789 issued Nov. 5, 1974 to Carl H Rohrer, and titled Sub-Surface Gas Main Replacement Method. See also our aforementioned Unitd States Patent Application.

Once such a live main insertion has been made, however, it is still necessary to tie over individual customer service lines from the outer low pressure main to the inner high pressure main, i.e., disconnect individual customer service lines from the old low pressure main and reconnect the lines to the new high pressure main. With the method and apparatus illustrated in our aforementioned co-pending patent application, it is not necessary to perform this tieover step immediately after the insertion procedure. As our aforementioned patent application describes in considerable detail, gas will be supplied to the annular space between the inner and outer gas mains. Thus, gas will continue to be supplied through the existing customer service connections to the old outer gas main until a given individual customer service line can be tied over.

The method of injecting a dense foam, e.g., polyurethane foam, into the annular space between the inner and outer mains to seal the annular space and prevent the flow of gas therethrough prior to tying over customer service connections from the outer main to the inner main is known. See, e.g., the aforementioned U.S. Pat. NO. 3,845,798 issued Nov. 5, 1974 to Carl H. Rohrer and titled Sub-Surface Gas Main Replacement Method.

However, it is frequently desirable to limit the portion of the annular space between the inner and outer mains into which the foam will flow during the injection step to prevent the foam interferring with subsequent phases of the tie-over operation and to achieve maximum utilization of the foam. It is thus an object of the present invention to provide a method for inserting dense foam into a controlled region of the annular space between the inner and outer mains prior to tying over individual customer service connections from the outer main to the inner main.

It is a further object of the present invention to provide a method of tying over an individual customer service connection from a live outer gas main to an inner gas main. The method comprises the steps of centering the inner main within the outer main, defining an annular region upstream, i.e., in the direction of the source of gas pressure, from the customer service connection to be tied over and opening the side wall of the live outer main intermediate the ends of the annular region. An amount of a high density plastic foam sufficient to fill the annular region is introduced through the opening. The foam is allowed to harden to establish a seal, thereby preventing gas from flowing downstream, i.e., in the direction of gas flow from the source of gas pressure, from the annular region to the service connection to be tied over. A section of the outer main is then cut away downstream from the foam filled annular region. The new customer service connection is made through the side wall of the inner main exposed by cutting away the outer main.

A further object of the present invention is to provide such a method wherein the downstream end of the annular region is controlled by a valved centering tool. All customer service connections below the downstream end of the annular region are closed to halt the flow of gas through the annular region. As the foam insertion step begins, the valve on the special centering tool is opened. Foam flowing through the annular region from the opening toward its downstream boundary encounters a static pressure chamber caused by the closed downstream service connections. The static pressure causes some of the foam to exit through the valve when the annular region is filled.

Another object of the present invention is to provide such a method wherein the annular region is defined by first and second line restrictors at its upstream and downstream ends, respectively. The first and second line restrictors allow gas to flow downstream, causing the foam to flow downstream to the second line restrictor. The annular region is thus filled from its downstream end as foam is introduced into the opening.

Figure 2:
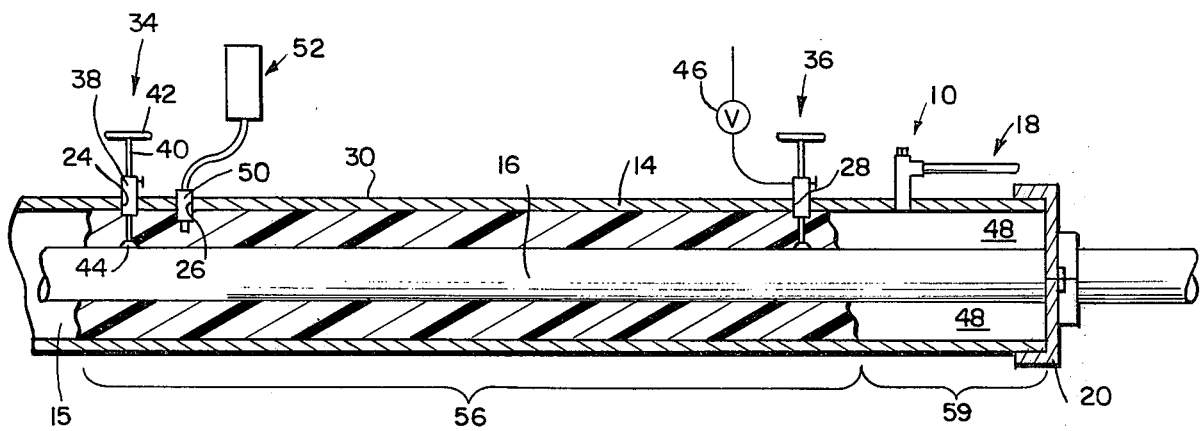
Figure 3:
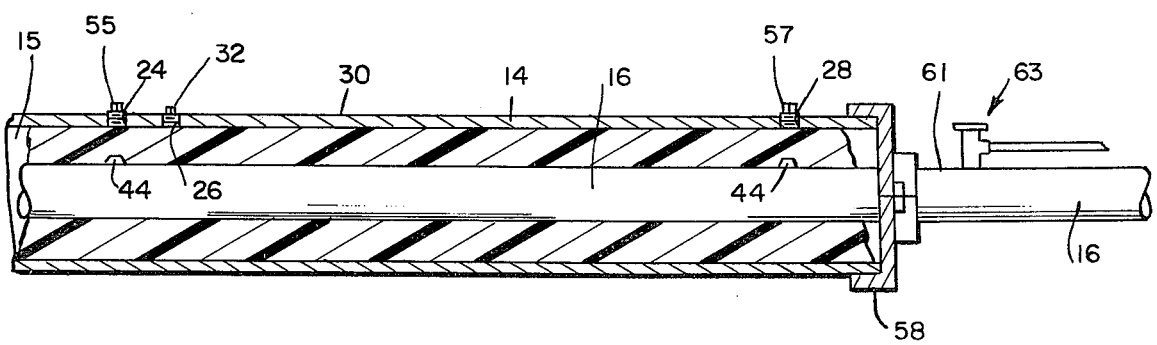
Figure 4:
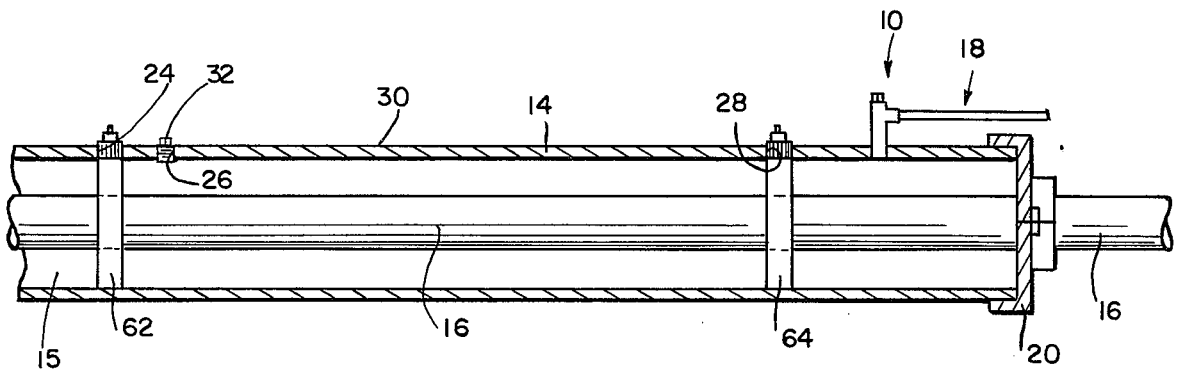
Figure 5:
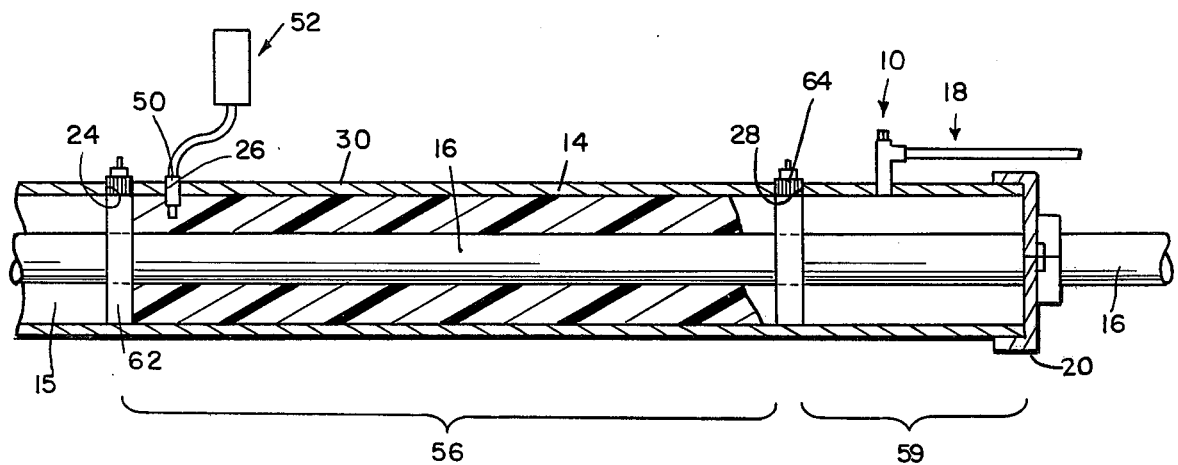
Figure 6:
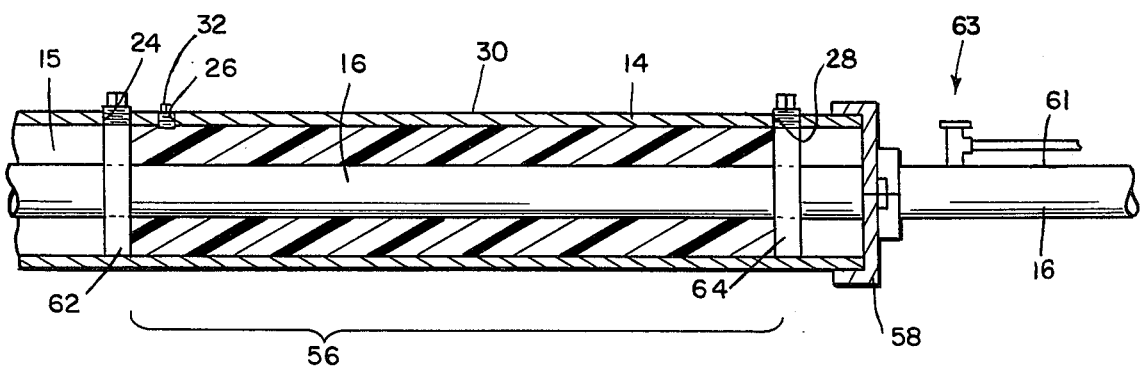

Other and further objects to the present invention will become obvious to those of ordinary skill in the art to which the invention pertains by referring to the following description and accompanying drawings of which:

FIGS. 1–3 illustrate fragmentary longitudinal sectional views of a live outer gas main into which an inner gas main has been inserted, in the first and subsequent phases, respectively, of a tie-over procedure in accordance with the method of the present invention; and, FIGS. 4–6 illustrate fragmentary longitudinal sectional views of a live outer gas main into which an inner main has been inserted, in the first and subsequent phases, respectively, of an alternative tie-over procedure according to the method of the present invention.

Referring now to FIG. 1, individual customer service tee 10 is shown connected to a live outer gas main 14. An inner main 16 has been inserted longitudinally into the live outer main by, for example, the method of our aforementioned co-pending United States Patent Application. An annular space 15 is thus defined between outer main 14 and inner main 16. Gas continues to be supplied through space 15 to customers connected to outer main 14. An individual customer service connection 18 extends from the service tee 10 to, for example, an individual residence (not shown).

Outer main 14 is terminated by an end cap 20. It is advantageous to begin the tie-over procedure for any given section of inserted main with that end of the main furthest from the gas pressure source. Delays in the interruption of service to individual gas consumers can thus be minimized. Therefore, beginning with the customer service tee 10 closest to end cap 20 (furthest from the gas pressure source, not shown) holes 24, 26, 28 are drilled and tapped through the wall 30 of the outer main. The arrangement of these holes 24, 26, 28 is as illustrated in the Figs. Hole 26 is temporarily closed by a screw-in plug 32. Holes 24, 28 are closed by a pair of centering tools 34, 36, respectively. Each of centering tools 34, 36 comprises a screw-in cylinder 38 which slidingly and sealingly receives a plunger 40 having a handle 42 at the outward end thereof and attachment means 44 at the inward end thereof. Attachment means 44 may be, for example, a suction cup attached to plunger 40 and adapted for attachment to the inner main 16 by a fast drying, high-strength glue. Centering tools 34, 36, of course, are used to center the inner main 16 in the outer main 14. Importantly, centering tool 36 also includes a valve 46 which provides a controlled passage outwardly from within outer main 14.

The individual customer service connection 18 downstream from the tapped holes 24, 26 28 is closed, halting the flow of gas through the outer main, and thus temporarily interrupting service to the customer attached to connection 18. Importantly, halting flow of gas in the outer main causes a static pressure region 48 to be formed downstream from hole 28, which static pressure region includes individual service connection 18 which is to be tied over.

After the inner main 16 has been centered in outer main 14 using tools 34, 36, plug 32 is removed and a screw in foam dispensing nozzle 50 is inserted into hole 26. Nozzle 50 is connected to a source 52 of liquid, high-density plastic foam, such as polyurethane foam, or a foaming material of similar characteristics. As foam is introduced into annular space 15, valve 46 is opened. As the foam enters annular space 15, pressure upstream from hole 24 restricts the migration of foam upstream from hole 24. However, opening of valve 46 allows the foam to flow downstream toward valve 46 through which valve a small amount of gas trapped in annular space 15 is allowed to escape. Once the foam reaches valve 46, however, it must begin to flow against the pressure in static pressure region 48. Consequently, foam will begin to flow outwardly through valve 46, indicating that a region 56 of annular space 15 extending generally between holes 24 and 28 has become filled with foam. Nozzle 50 is removed from hole 26 and the foam is allowed to harden in the annular region 56 between holes 24, 28 upstream from the customer service connection 18. of course, plug 32 may be replaced in hole 26 until the foam has completely hardened.

After the foam is hardened, centering tools 34, 36 are removed, leaving suction cups 44 attached to inner main 16. Holes 24, 28 are then closed by tapped plugs 55, 57, respectively. A section 59 of outer main 14, downstream from the foam-filled region 56, is cut away to expose the sidewall 61 of inner main 16 in the region in which the individual service connection 18 is to be tied over. A split end seal 58 is then placed over the end of outer main 14 seal it to inner main 16 further to insure the integrity of the seal created by the foam-filled region 56 in annular space 15. The individual customer service is then tied over to the exposed inner main 16 as illustrated at 63 using conventional techniques.

In a second technique using the method of the present invention, those elements which perform the same or similar functions as in the proceeding embodiment are numbered identically. In the second embodiment a pair of line restrictors 62, 64 are inserted into holes 24, 28 of outer main 14. Line restrictors 62, 64 serve to center inner main 16 within outer main 14, and also to provide barriers over which foam injected into the annular region 56 between them will not flow. Line restrictors 62, 64 do not prevent gas from flowing through annular region 56.

High-density foam is injected from foam source 52 through screw-in foam dispensing nozzle 50 located in hole 26. Since gas flow past restrictors 62, 64 is not interrupted and the gas service to the individual customer service connection 18 downstream from restrictor 64 is not shut off, gas continues to flow downstream past restrictor 62, carrying with it the foam injected into annular region 56. The entire annular region 56 upstream from the customer service connection 18 to be tied over is filled with foam. Dispensing nozzle 50 is removed and plug 32 is replaced in hole 26. The foam in region 56 is allowed to harden. Since the foam does fill region 56 entirely, the hardened foam prevents the flow of gas through region 56.

When the foam in annular region 56 is hardened, a portion 59 of the wall of outer main 14 downstream from region 56 is removed to expose the sidewall 61 of inner main 16 in the region in which the tie-over connection is to be made. A split end seal 58 is installed to insure that no leakage of gas will occur through the foam in region 56. Then the individual customer service is tied over at 63 to inner main 16.

There is thus presented a method of tying over an individual customer service connection from a live outer gas main to inner main inserted within the live outer main. The inner main is centered within the outer main and an annular region upstream from the customer service connection to be tied over is selected for insertion of a high-density plastic foam. The plastic foam, when injected into the annular region and allowed to harden, seals the region and prevents gas from flowing downstream therethrough. After the foam has hardened, a section of the outer main downstream from the foam-filled region can be removed and the individual customer service connection made through the side wall of the inner main exposed by cutting away the section of outer main. Significantly, the annular region into which the high-density foam is injected is controlled in the method presented. The foam is thereby prevented from entering the annular space between the section of outer main to be cut away and the section of inner main to which the individual customer service connection will be tied over. Advantageously, foam will be prevented from flowing downstream in the annular space into the region of the customer service connection to the outer main.

In FIG. 1, there is shown an alternative viewing plug and port 46' and an alternative plug 32' in an opening 26'. The purpose of this showing is to carry out the method above disclosed using a slightly different technique involving the viewing port 46' and plug 32'.

This alternative method of sealing the annular space 15 for service tie-overs requires a low gas flow or no flow condition in annular region 56. It is the easiest of the three methods to use when the pressure is low because it does not require a controlled gas flow in the annular region 56 for propagation of the foam. Instead the foam is allowed freely to propagate in region 56 after the inserted plastic main 16 has been centered in this annular region. The centering of the inserted main allows the foam completely to encircle it for a more positive shutoff. The view port 46' that is installed allows a technician to fill region 56 with foam through openings 26'. After the foam is injected and allowed to harden, section 59 of outer main is broken out and a split end seal 58 is installed for mechanical strength and safety (see FIG. 3). The service connection is then tied over to the inner main 16.

Although the method and aparatus herein disclosed are not limited in application to any range of gas pressures, they are particularly useful with gas pressures in excess of five pounds per square inch.

What is claimed is:

1. A method of tying over an individual customer service connection from a live outer gas main to an inner gas main inserted within the live outer gas main comprising the steps of centering the inner main within the outer main, defining an annular region within the annular space between the inner and outer mains, said region being upstream from the customer service connection between the customer service connection and the source of low pressure gas for the outer main, opening a sidewall of the live outer main intermediate the ends of said annular region, introducing into said opening an amount of a high-density liquid foam sufficient to fill said annular region, allowing the foam to harden to prevent gas from flowing downstream below said annular region to the service connection to be tied over, cutting away a section of outer main downstream from the annular region, and placing the new customer service connection through the sidewall of the inner main exposed by cutting away the outer main.

2. The method of claim 1 wherein customer service connections to the live outer main downstream from said annular region are turned off prior to introducing the liquid foam through said opening to define a static pressure chamber downstream from said annular region.

3. The method of claim 2 wherein the centering step is performed with a valved centering tool for defining the downstream end of said annular region, the foam flowing out of said annular region through the valve in said valved centering tool when the foam reaches the downstream stream boundary of said annular region, said static pressure chamber aiding in causing the foam to exit through said valve when said annular region is filled with foam.

4. The method of claim 1 wherein said annular region is defined by first and second line restrictors at its upstream and downstream ends, respectively, said first and second line restrictors allowing gas to flow downstream, causing the foam to flow downstream to said second line restrictor thereby filling said annular region with foam.

5. The method of claim 4 wherein said opening is placed downstream of, and adjacent said first line restrictor to introduce the foam near the upstream boundary of said annular region.

6. A method of tying over an individual customer service connection from a live outer gas main to an inner gas main inserted within the live outer gas main comprising the steps of defining a longitudinal section within the annular space between the inner and outer mains, said longitudinal section being upstream from the customer service connection between the customer service connection and the source of low pressure gas for the outer main, opening a sidewall of the live outer main intermediate the ends of said longitudinal section, introducing into said opening an amount of a high-density liquid foam sufficient to fill said longitudinal section, allowing the foam to harden to prevent gas from flowing downstream below said longitudinal section to the service connection to be tied over, cutting away a portion of the outer main downstream from the longitudinal section, and placing the new customer service connection through the sidewall of the inner main exposed by cutting away the outer main.

7. The method of claim 6 wherein customer service connections to the live outer main downstream from said longitudinal section are turned off prior to introducing the liquid foam through said opening to define a static pressure chamber downstream from said longitudinal section.

8. The method of claim 7 wherein valve means for defining the downstream end of said longitudinal section is inserted into the sidewall of the outer main, the foam flowing out of said longitudinal section through said valve means when the foam reaches the downstream boundary of said longitudinal section, said static pressure chamber aiding in causing the foam to exit through said valve means when said longitudinal section is filled with foam.

9. The method of claim 6 wherein said longitudinal section is defined by first and second line restrictors at its upstream and downstream ends, respectively, said first and second line restrictors allowing gas to flow downstream, causing the foam to flow downstream to said second line restrictor thereby filling said longitudinal section with foam.

10. The method of claim 9 wherein said opening is placed downstream of, and adjacent said first line restrictor to introduce the foam near the upstream boundary of said longitudinal section.

* * * * *